US008132027B2

(12) United States Patent
Blaha et al.

(10) Patent No.: US 8,132,027 B2
(45) Date of Patent: Mar. 6, 2012

(54) TRANSFORMERLESS POWER OVER ETHERNET SYSTEM

(75) Inventors: Matthew Blaha, Holmdel, NJ (US);
Luis de La Torre, Daganzo de Arriba (ES); Alan L. Ellis, San Jose, CA (US); Gary D. Polhemus, Sebago, ME (US); Patrick J. Quirk, Huntsville, AL (US)

(73) Assignee: Agere Systems Inc., Allentown, PA (US)

( * ) Notice: Subject to any disclaimer, the term of this patent is extended or adjusted under 35 U.S.C. 154(b) by 1020 days.

(21) Appl. No.: 11/917,261

(22) PCT Filed: Jun. 16, 2006

(86) PCT No.: PCT/US2006/023786
§ 371 (c)(1), (2), (4) Date: Dec. 12, 2007

(87) PCT Pub. No.: WO2006/138713
PCT Pub. Date: Dec. 28, 2006

(65) Prior Publication Data
US 2010/0218003 A1 Aug. 26, 2010

Related U.S. Application Data

(60) Provisional application No. 60/691,133, filed on Jun. 16, 2005.

(51) Int. Cl.
*G06F 1/00* (2006.01)
(52) U.S. Cl. ...................................................... 713/300
(58) Field of Classification Search .................. 713/300; 709/208
See application file for complete search history.

(56) References Cited

U.S. PATENT DOCUMENTS

| 4,004,104 | A | 1/1977 | Picandet et al. ................. 179/70 |
| 4,761,702 | A | 8/1988 | Pinard ............................. 361/18 |
| 5,138,543 | A | 8/1992 | Harm et al. ................. 363/21.08 |
| 5,305,192 | A | 4/1994 | Bonte et al. ................. 363/21.16 |
| 5,402,329 | A | 3/1995 | Wittenbreder .................. 363/16 |

(Continued)

FOREIGN PATENT DOCUMENTS

DE 103 32 841 A1 2/2005

(Continued)

OTHER PUBLICATIONS

EECE 542, 7 Layer OSI Model, www.eece.ksu.edu/~eece542/Lectures/lecture2.ppt, Aug. 25, 2003.*

(Continued)

*Primary Examiner* — Mark Connolly
(74) *Attorney, Agent, or Firm* — Mendelsohn, Drucker, & Associates, P.C.; Edward J. Meisarosh; Steve Mendelsohn (57) ABSTRACT

In one embodiment, a powered device (PD) (402) has a PHY module (410) and a media access controller (419) (MAC), the PD (402) adapted to connect to power sourcing equipment (PSE) via a cable, (408) where the PD (402) is adapted to communicate with and receive power from the PSE via the cable, in accordance with the Power-over-Ethernet (PoE) standard. The PD (402) extracts (413) from the cable (408) a DC signal used to power the PD without using a transformer. Capacitors (420) located in the signal paths between the MAC (419) and the cable (408) support electrical isolation of the MAC (419).

20 Claims, 5 Drawing Sheets

U.S. PATENT DOCUMENTS

| | | | | |
|---|---|---|---|---|
| 5,461,303 | A | 10/1995 | Leman et al. | 323/222 |
| 5,757,625 | A | 5/1998 | Schoofs | 363/21.13 |
| 5,789,959 | A * | 8/1998 | Dielacher et al. | 327/303 |
| 5,991,172 | A | 11/1999 | Jovanovic et al. | 363/21.14 |
| 6,343,026 | B1 | 1/2002 | Perry | 363/65 |
| 6,640,308 | B1 | 10/2003 | Keyghobad et al. | 713/300 |
| 6,650,070 | B1 | 11/2003 | Hudson et al. | 315/312 |
| 6,958,920 | B2 | 10/2005 | Mednik et al. | 363/19 |
| 6,967,472 | B2 | 11/2005 | Balakrishnan et al. | 323/284 |
| 6,972,969 | B1 | 12/2005 | Shteynberg et al. | 363/21.12 |
| 6,977,824 | B1 | 12/2005 | Yang et al. | |
| 6,995,991 | B1 | 2/2006 | Yang et al. | 363/21.03 |
| 7,054,170 | B2 | 5/2006 | Yang et al. | 363/21.18 |
| 7,057,907 | B2 | 6/2006 | Oh | 363/21.05 |
| 7,061,780 | B2 | 6/2006 | Yang et al. | 363/21.16 |
| 7,142,437 | B2 | 11/2006 | Park | 363/18 |
| 7,196,503 | B2 | 3/2007 | Wood et al. | 323/276 |
| 7,259,972 | B2 | 8/2007 | Yang | 363/21.16 |
| 7,280,376 | B2 | 10/2007 | McDonald et al. | 363/20 |
| 7,307,390 | B2 | 12/2007 | Huynh et al. | |
| 7,362,593 | B2 | 4/2008 | Yang et al. | 363/21.16 |
| 7,471,522 | B2 | 12/2008 | Ng et al. | 363/21.12 |
| 7,471,531 | B2 | 12/2008 | Blaha et al. | 363/97 |
| 7,486,528 | B2 | 2/2009 | Yang | 363/21.12 |
| 2003/0080723 | A1 | 5/2003 | Chen et al. | 324/76.29 |
| 2005/0169017 | A1 | 8/2005 | Muegge et al. | 363/21.15 |
| 2005/0285587 | A1 | 12/2005 | Yang et al. | 324/103 P |
| 2006/0002155 | A1 | 1/2006 | Shteynberg et al. | 363/21.12 |
| 2006/0034102 | A1 | 2/2006 | Yang et al. | 363/21.13 |
| 2006/0056204 | A1 | 3/2006 | Yang et al. | 363/10 |
| 2006/0117089 | A1 * | 6/2006 | Karam | 709/208 |
| 2006/0245449 | A1 | 11/2006 | Neuhaus | |
| 2007/0019445 | A1 | 1/2007 | Blaha et al. | 363/21.12 |
| 2007/0024213 | A1 | 2/2007 | Shteynberg et al. | 315/291 |
| 2007/0070664 | A1 | 3/2007 | Chen | 363/95 |
| 2008/0049459 | A1 | 2/2008 | Blaha et al. | 363/21.16 |
| 2008/0071260 | A1 | 3/2008 | Shores | 606/34 |
| 2008/0192514 | A1 | 8/2008 | Zhou et al. | 363/21.12 |
| 2008/0238447 | A1 | 10/2008 | de la Torre Vega et al. | 324/676 |

FOREIGN PATENT DOCUMENTS

| | | |
|---|---|---|
| JP | 2001203085 | 7/2001 |
| WO | WO 2004/034284 A2 | 4/2004 |
| WO | WO 2004107602 A1 | 12/2004 |

OTHER PUBLICATIONS

"High Power Isolated Flyback Controller", Linear Technology. pp. 1-28. Downloaded from: http://www.linear.com/pc/productDetail.do?navId=HO,C1,C1003,C1042,C1113,P1920, Apr. 5, 2006.

L. Balogh, "A Practical Introduction to Digital Power Supply Control", Texas Instruments Incorporated, 2005, pp. 6-1 through 6-29. Downloaded from http://focus.ti.com/lit/ml/slup232.pdf, Apr. 5, 2006.

L. Dixon, "Control Loop Cookbook", Texas Instruments Incorporated, 2002, 41 pp.. Downloaded from: http://focus.ti.com/lit/ml/slup113a/slup113a.pdf, Apr. 5, 2006.

K. Kittipeerachon, et al., "Feedback Compensation Design for Switched Mode Power Supplies with A Right-Half-Plane (RHP) Zero", Power Electronics, Machines and Drives, 2004, (PEMD 2004). Second International Conference on (Conf. Publ. No. 498), pp. 236-241.

Y-F. Liu, et al., "Digital Control of Switching Power Converters", Proc. of IEEE Conference on Control Applications, Toronto, Canada, Aug. 28-31, 2005, pp. 635-640.

A. Peterchev, et al., "Quantization Resolution and Limit Cycling in Digitally Controlled PWM Converters", IEEE Trans. on Power Electronics, vol. 18, No. 1, Jan. 2003, pp. 301-308.

"Introduction to Power Supplies", National Semiconductor Application Note 556, Sep. 2002, pp. 1-7. Downloaded from: http://www.efficientpowersupplies.org/pp./intro_to_power_supplies.pdf, Apr. 5, 2006.

Japanese Office Action in JP A 2008-517210 (mail date: Nov. 29, 2010), 5 pages.

Japanese Office Action; Mailed May 30, 2011 for corresponding Japanese Application No. JP 2008-517210.

* cited by examiner

TRANSFORMERLESS POWER OVER ETHERNET SYSTEM

This application claims the benefit of the filing date of U.S. provisional application No. 60/691,133, filed on Jun. 16, 2005, the teachings of which are incorporated herein by reference.

BACKGROUND OF THE INVENTION

1. Field of the Invention

The current invention relates to communication networks capable of transmitting electrical power along with data, and more particularly, to systems and methods for the provision of electrical power in Power-over-Ethernet (PoE) systems.

2. Description of the Related Art

A Power-over-Ethernet system is an Ethernet network capable of transmitting both data and electrical power over twisted pair wires, such as category 5 cables. Ethernet is currently defined by the IEEE 802.3 standard, and PoE is currently defined by the IEEE 802.3af standard, both of which are incorporated herein by reference. Using PoE allows for the convenient delivery of electrical power to Ethernet client devices, such as Internet telephones or cameras, that may otherwise require more cumbersome powering arrangements in order to operate. PoE allows for the delivery of electrical power using the same cables that deliver Ethernet data.

Figure 1:
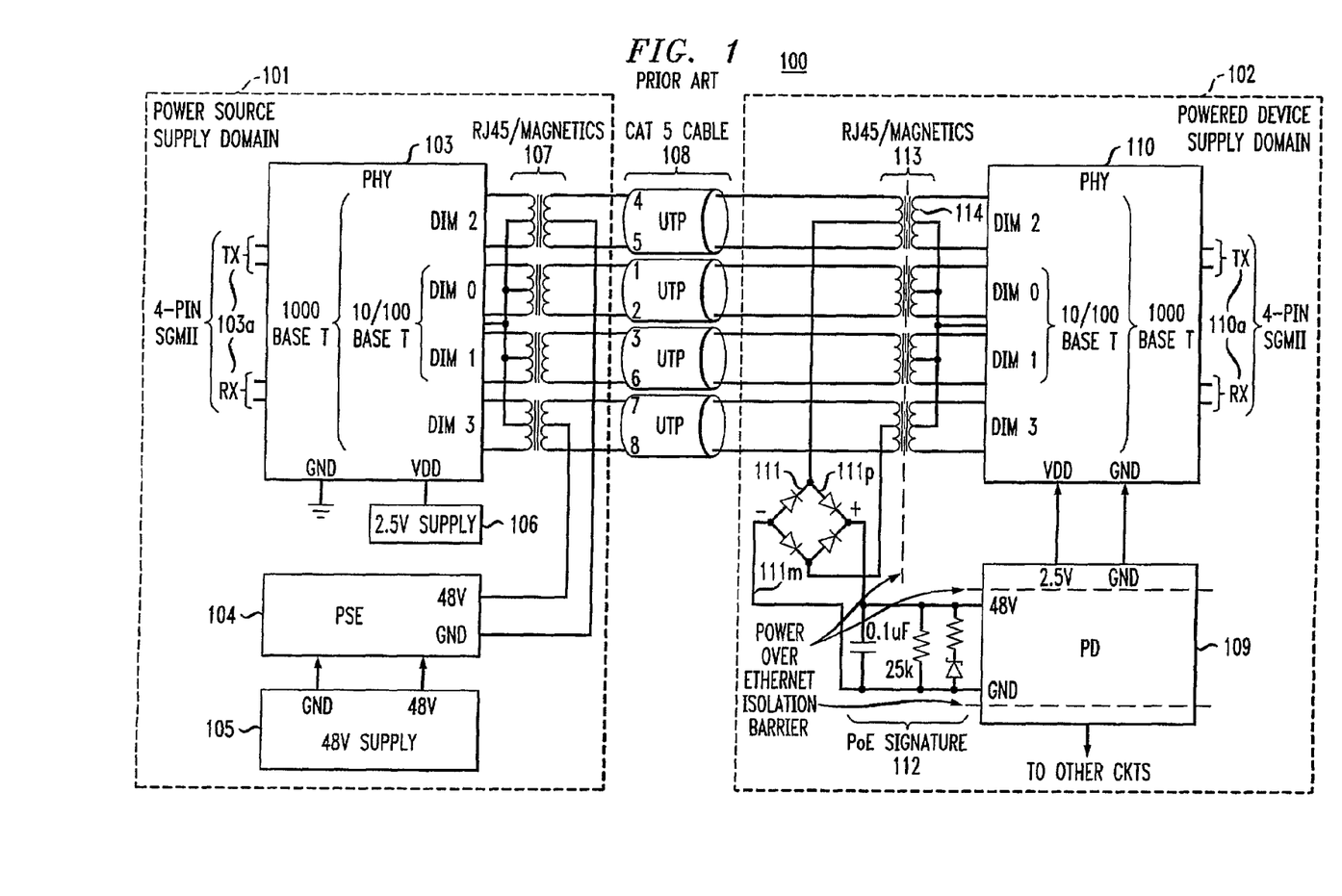
FIG. 1 shows a simplified block diagram of a prior-art PoE system.

FIG. 1 shows a simplified block diagram of conventional PoE system 100. PoE system 100 comprises power sourcing equipment (PSE) device 101, powered device (PD) 102, and unshielded twisted pair (UTP) category 5 cable 108. PSE device 101 comprises power supplies 105 and 106, PSE module 104, PHY module 103, and RJ45 interface 107. PD device 102 comprises PHY module 110, PD module 109, bridge circuit 111, signature circuit 112, and RJ45 interface 113. Cable 108 connects PSE device 101 to PD device 102. PoE system 100 is shown in FIG. 1 adapted to employ the PoE optional connection method called Alternative B, in which power is carried over the so-called spare pairs (wire pairs 4/5 and 7/8). The so-called spare pairs are used as spares in 10 MBit and 100 MBit Ethernet systems, and are used for data transmission in Gigabit (1000 MBit) Ethernet systems. Using Alternative A (not shown), power is carried over the so-called data pairs (1/2 and 3/6) using so-called "phantom feeding." The so-called data pairs are used for data transmission in all, i.e., 10 MBit, 100 MBit, and Gigabit, Ethernet systems. PSE device 101 selects the connection method to employ, and the PoE standard requires that PD device 102 be able to use either connection method. Thus, PD device 102 has additional components, not shown, known to one of ordinary skill in the art, as are needed to comply with the requirements of the PoE standard, including, for example, another bridge circuit, similar to bridge circuit 111, connected to the data pairs.

Power supply 105 provides a 48V DC signal to PSE module 104. PSE module 104 contains the PSE control circuitry and provides a 48V DC differential signal to the spare pairs of cable 108, in particular, a 48V DC signal to wires 7 and 8 of cable 108, and a ground signal to wires 4 and 5 of cable 108. These polarities may also be reversed without departing from the PoE standard. If PSE module 104 were providing power using Alternative A (not shown), then PSE module 104 would provide a 48V DC differential signal to the data pairs of cable 108. PHY module 103 is powered by power supply 106, which provides 2.5V DC. PHY module 103 functions as the physical layer interface between signals provided to/from RJ45 interface 107 and signals provided via path 103a. Path 103a provides a connection via a 4-pin serial Gigabit medium-independent interface (SGMII) to and from a device at a network layer higher than the physical layer, such as an Ethernet media access controller (MAC) (not shown). RJ45 interface 107 uses center-tapped transformers to allow the transmission of power from PSE module 104 and/or data to/from PHY module 103, while simultaneously maintaining electrical isolation across RJ45 interface 107.

Cable 108 transmits electrical power and data from PSE device 101 to PD device 102, as well as data from PD device 102 to PSE device 101. RJ45 interface 113, like RJ45 interface 107, uses center-tapped transformers, such as transformer 114, to allow the transmission of power while simultaneously maintaining electrical isolation across RJ45 interface 113. The signals on the spare pairs have a data component if, for example, PoE system 100 uses Gigabit Ethernet. The data component of a signal on a wire pair is transmitted through RJ45 interface 113 to/from PHY module 110, which transforms the data for/from transmission via 4-pin SGMII path 110a.

The DC signal component of the signal on the spare pairs goes to bridge circuit 111, which ensures that regardless of the polarity of the voltage on the spare pairs, the polarity of the voltage output by bridge circuit 111 is the same, i.e., that signal 111p provides the higher voltage (e.g., 48V) and signal 111m provides the lower voltage (e.g., ground). Signals 111p and 111m are provided to PD module 109 via PoE signature circuit 112. PoE signature circuit 112 contains circuitry used in performing PD signature functions such as detection and optional classification. If signature circuit 112, or its equivalent, is not present, and if PSE device 101 polls PD device 102, then no PD is detected, and PSE module 104 does not provide power. Optional classification indicates to PSE device 101 the expected power consumption of PD device 102 so that PSE module 104 can appropriately manage power requirements.

PD module 109 receives signals 111p and 111m and uses them to provide power to PHY module 110 as well as to other components of PD device 102 (not shown), while keeping PHY module 110 and the other components electrically isolated from DC signals 111p and 111m. PHY module 110 of PSE device 102 functions in substantially the same way as PHY module 103 of PSE device 101. In particular, PHY module 110 functions as the physical layer interface between signals provided to/from RJ45 interface 113 and signals provided via path 110a. Path 110a is a connection to an Ethernet MAC (not shown) via a 4-pin SGMII interface.

SUMMARY OF THE INVENTION

In one embodiment, the invention is an apparatus comprising a first physical layer interface device, a cable interface, and at least one capacitor located in a signal path between the cable and the communication device. The first physical layer interface device is adapted to interface between a communication device and the cable, which is further adapted to interface with a second physical layer interface device, wherein the cable comprises one or more wire pairs, wherein each wire pair has a first wire and a second wire. The cable interface is adapted to connect between the first physical layer interface device and the cable. The cable interface comprises one or more DC signal devices, each having first and second inputs and an output, wherein the first and second wires of at least one wire pair are connected to the first and second inputs, respectively, of a corresponding DC signal device. Each DC signal device is adapted to extract or inject a DC component of a signal on the corresponding wire pair.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In one embodiment of the present invention, the transformers of RJ45 interface 113 in PD device 102 of FIG. 1 are replaced by high-voltage capacitors and DC signal extraction devices, thus making a transformerless PD device that employs a transformerless method of electrical isolation and power provision. The high-voltage capacitors provide electrical isolation, while the DC signal extraction devices extract the DC signal, if any, on a wire pair in cable 108.

Figure 2:
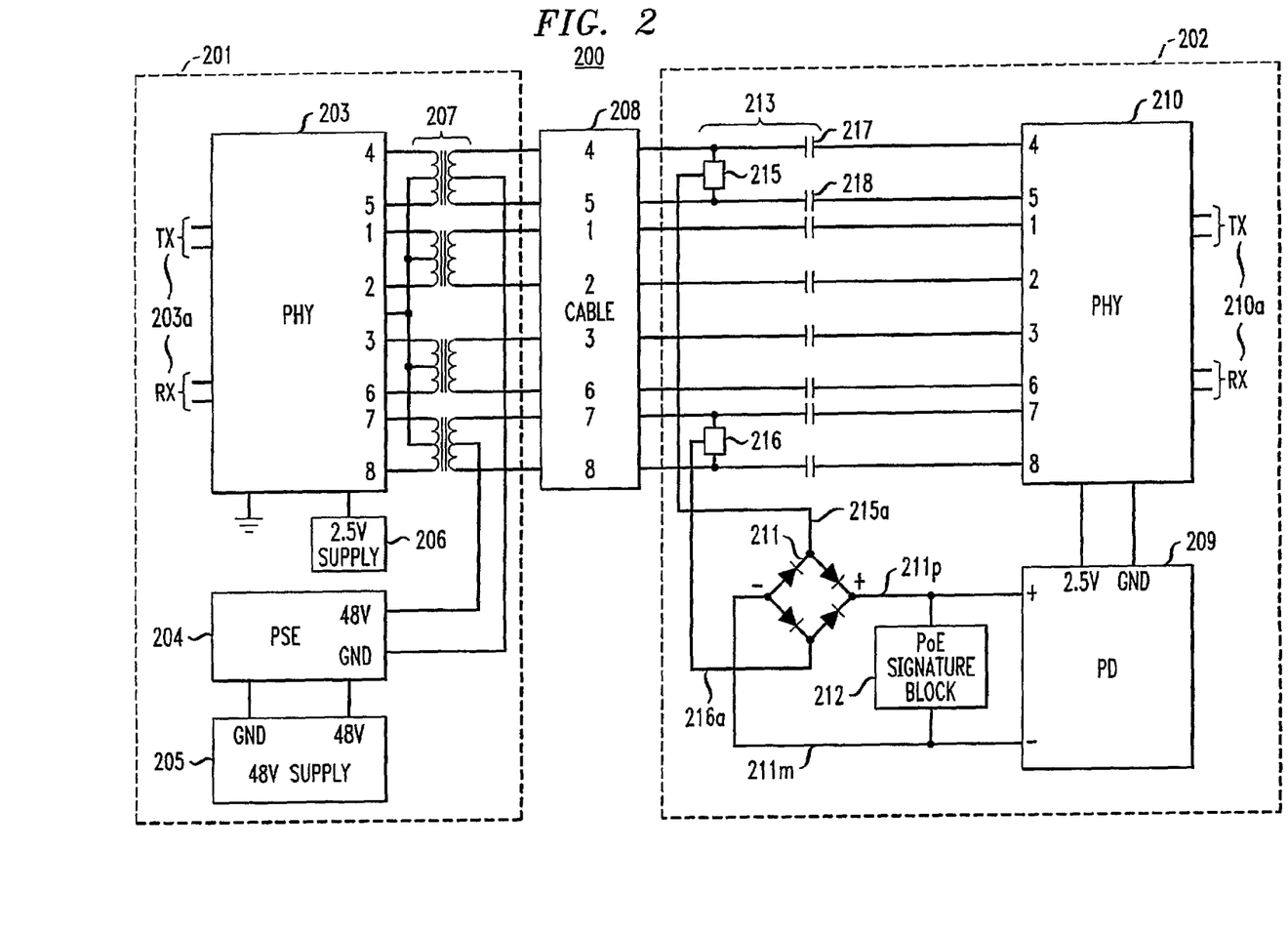
FIG. 2 shows a simplified block diagram of a PoE system in accordance with one embodiment of the present invention.

FIG. 2 shows a simplified block diagram of PoE system 200 in accordance with one embodiment of the present invention. Elements in PoE system 200 that are similar to elements in PoE system 100 of FIG. 1 have been similarly labeled, but with a different prefix. PoE system 200 is shown and described as adapted for using Alternative B, as was PoE system 100. PoE system 200 comprises PSE device 201 connected via cable 208 to PD device 202. PSE device 201 comprises power supplies 205 and 206, PSE module 204, PHY module 203, and RJ45 interface 207. PSE device 201 functions in substantially the same way as PSE device 101 of FIG. 1. Cable 208 functions in substantially the same way as cable 108 of FIG. 1.

PD device 202 comprises PHY module 210, PD module 209, bridge circuit 211, signature circuit 212, and RJ45 interface 213. PHY module 210, PD module 209, bridge circuit 211, and signature circuit 212 function in substantially the same way as the corresponding components of PD device 102 of FIG. 1, as described above. Path 210a connects PHY module 210 to an Ethernet MAC (not shown) using a 4-pin SGMII interface. RJ45 interface 207 comprises four DC signal extraction devices (two shown), such as DC signal extraction devices 215 and 216. Each wire pair has its own DC signal extraction device, which has (i) two inputs, each connected to one of the wires of the wire pair, and (ii) one output, connected to an input of a bridge circuit. DC signal extraction device 215 has two inputs, one connected to wire 4 of cable 208, and the other connected to wire 5 of cable 208. DC signal extraction device 215 has one output, connected to bridge circuit 211 via path 215a. DC signal extraction device 216 has two inputs, one connected to wire 7 of cable 208, and the other connected to wire 8 of cable 208. DC signal extraction device 216 has one output, connected to bridge circuit 211 via path 216a.

Each wire pair is also intersected by a pair of capacitors, preferably high-voltage capacitors, such as ceramic chip capacitors, located between a corresponding DC extraction device and PHY module 210. The capacitors provide electrical isolation. Wires 4 and 5, for example, are intersected by capacitors 217 and 218, respectively. Together, DC signal extraction device 215 and capacitors 217 and 218 in PoE system 200 perform substantially the same functions as transformer 114 in PoE system 100. Those functions are extracting the DC signal, if any, in wire pair 4/5 for provision to bridge circuit 211, and transmitting the data signal, if any, in wire pair 4/5 to PHY module 210, while providing electrical isolation between cable 208 and PHY module 210. Each of the other wire pairs in RJ45 interface 213 is similarly connected to a DC signal extraction device and is intersected by a pair of capacitors located between the DC signal extraction device and PITY module 210.

Figure 3:
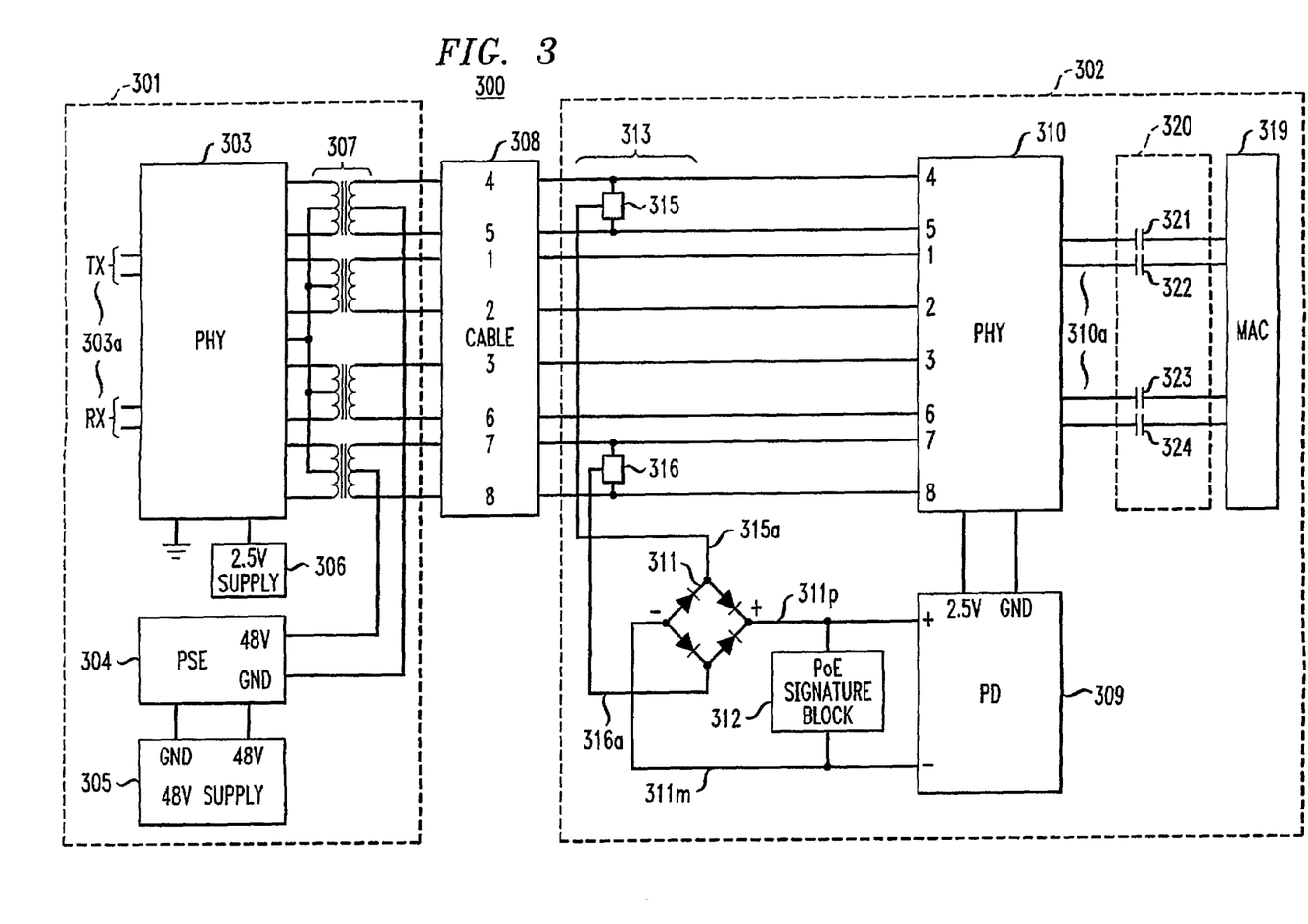
FIG. 3 shows a simplified block diagram of a PoE system in accordance with another embodiment of the present invention.

FIG. 3 shows a simplified block diagram of PoE system 300 in accordance with another embodiment of the present invention. Elements in PoE system 200 that are similar to elements in PoE systems 100 and/or 200 have been similarly labeled, but with a different prefix. PoE system 300 is shown and described as adapted to use Alternative B, as were PoE systems 100 and 200. PoE system 300 comprises PSE device 301 connected via cable 308 to PD device 302. PSE device 301 comprises power supplies 305 and 306, PSE module 304, PHY module 303, and RJ45 interface 307. PSE device 301 functions in substantially the same way as PSE devices 101 of FIG. 1 and 201 of FIG. 2. Cable 308 functions in substantially the same way as cables 108 of FIG. 1 and 208 of FIG. 2.

PD device 302 comprises PHY module 310, PD module 309, bridge circuit 311, signature circuit 312, RJ45 interface 313, Ethernet MAC 319, and isolation module 320. PHY module 310, PD module 309, bridge circuit 311, and signature circuit 312 function in substantially the same way as the corresponding components of PD devices 102 of FIGS. 1 and 202 of FIG. 2, as described above. Path 310a connects PHY module 310 to MAC 319 using a 4-pin SGMII interface. RJ45 interface 313 comprises four DC signal extraction devices (two shown), such as DC signal extraction devices 315 and 316, which each function similarly to DC signal extraction devices 215 and 216, as described above. However, each wire pair is then connected to PHY module 310 without intervening capacitors, in contrast to the intersecting capacitors of PD device 202 of FIG. 2. Since PHY module 310 is adapted to generally handle high-voltage transients that may appear on cable 308, it can be connected to cable 308 without electrical isolation. The electrical isolation required for components connected to PHY module 310 can be provided on the other side, on path 310a, by isolation module 320. Isolation module 320 comprises capacitors 321, 322, 323, and 324, which are integrated into the 4 pins of the SGMII interface to MAC 319. PD device 302 uses fewer capacitors than PD device 202 of FIG. 2 and should thus cost less. Isolation module 320 provides electrical isolation between PHY module 310 and MAC 319.

Figure 4:
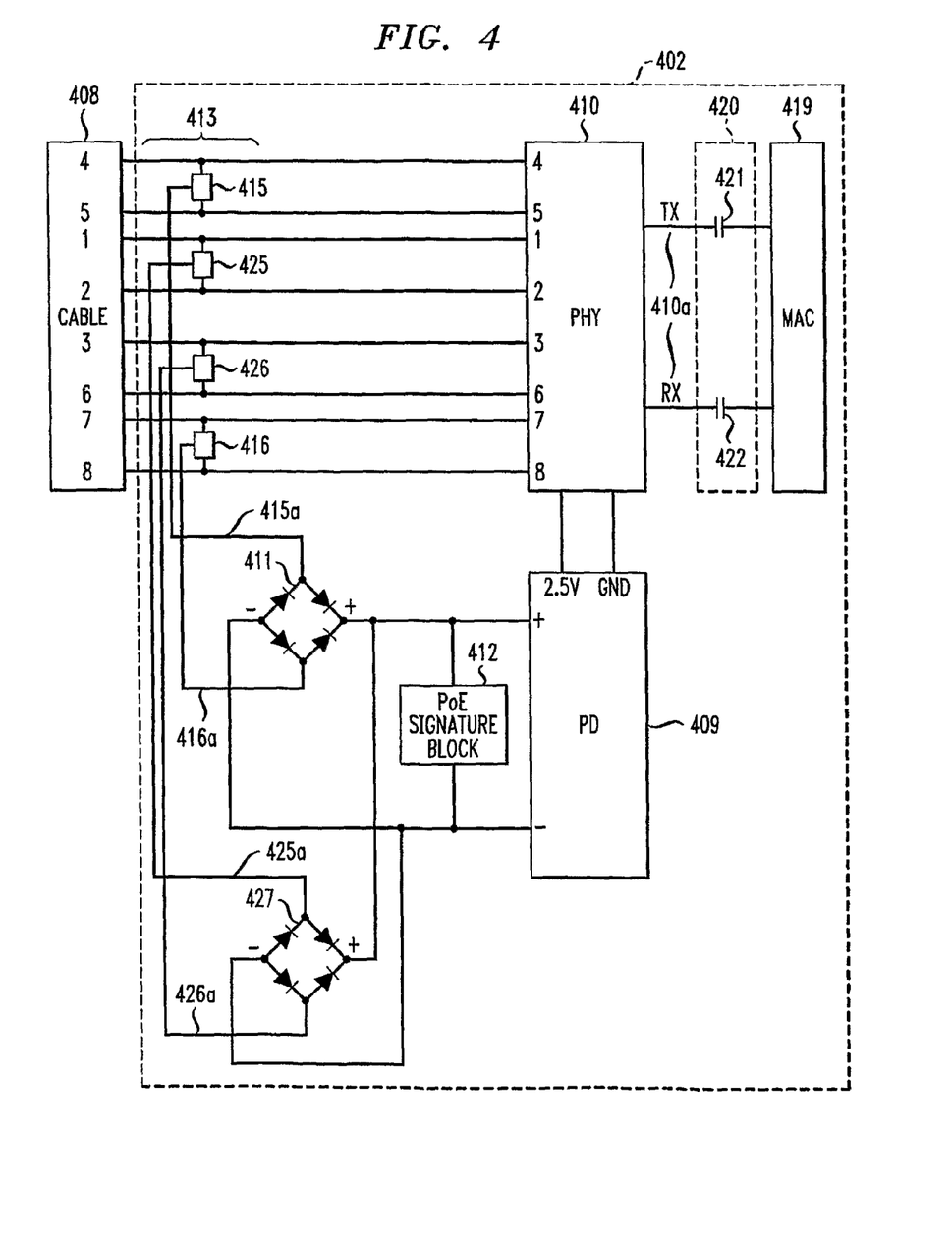
FIG. 4 shows a simplified block diagram of an alternative implementation of the PD device of FIG. 3.

FIG. 4 shows PD device 402 along with cable 408, in accordance with an alternative embodiment of the invention. This embodiment uses only 2 isolation capacitors and so may cost less than other described embodiments, but may also suffer from comparatively increased noise and, hence, reduced performance. Elements in PD device 402 that are similar to elements in PD devices 102, 202, and/or 302 have been similarly labeled, but with a different prefix. PD device 402 performs substantially the same functions as PD devices 102 of FIG. 1, 202 of FIG. 2, and 302 of FIG. 3. However, PD device 402 communicates with MAC 419 using a 2-pin SGMII interface, while PD devices 102, 202, and 302 use standard 4-pin SGMII interfaces. Cable 408 is similar to cables 108 of FIG. 1, 208 of FIG. 2, and 308 of FIG. 3. PD device 402 comprises PHY module 410, PD module 409, signature block 412, RJ45 interface 413, bridge circuits 411 and 427, isolation module 420, and Ethernet MAC 419. PD module 409, signature block 412, and RJ45 interface 413 function similarly to the corresponding components of PD device 302 of FIG. 3. Bridge circuits 411 and 427 function similarly to bridge circuits 111 of FIG. 1, 211 of FIG. 2, and 311 of FIG. 3.

RJ interface 413 comprises DC signal extraction devices 415, 425, 426, and 416, wherein each is similar to DC signal extraction devices 215 of FIG. 2 and 315 of FIG. 3. The DC signal extraction devices' inputs and outputs are connected as shown in Table I, below.

TABLE I

| DC extraction device | Input Wires | Output Signal | Bridge Circuit |
| --- | --- | --- | --- |
| 415 | 4 and 5 | 415a | 411 |
| 425 | 1 and 2 | 425a | 427 |
| 426 | 3 and 6 | 426a | 427 |
| 416 | 7 and 8 | 416a | 411 |

PHY module 410 is similar in form and function to PHY modules 110 of FIG. 1, 210 of FIG. 2, and 310 of FIG. 3. However PHY module 410 is programmed differently so as to be able to communicate with Ethernet MAC 419 using a 2-pin SGMII interface via path 410a. Ethernet MAC 419 also needs to be programmed to be able to communicate using a 2-pin SGMII interface, rather than a standard 4-pin SGMII interface. Isolation module 420 comprises capacitors 421 and 422, which are integrated into the 2 pins of the 2-pin SGMII interface to Ethernet MAC 419. Isolation module 420 provides electrical isolation between PHY module 410 and Ethernet MAC 419.

Figure 5:
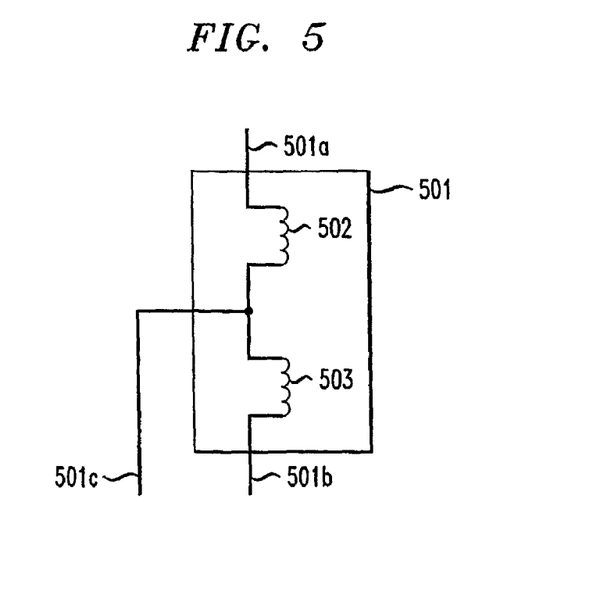
FIG. 5 shows a simplified block diagram of a DC signal extraction device in accordance with one embodiment of the present invention.

FIG. 5 shows a simplified block diagram of DC signal extraction device 501, in accordance with an embodiment of the present invention. DC signal extraction device 501 provides an implementation of DC signal extraction devices, such as devices 215 and 216 of FIGS. 2, 315 and 316 of FIG. 3, and 415, 425, 426, and 416 of FIG. 4. DC signal extraction device 501 comprises two inductors, 502 and 503, both connected to output 501c. Inductor 502 is connected to input 501a and inductor 503 is connected to input 501b.

In DC signal extraction device 501, DC power comes through inductors 502 and 503 unimpeded, while their inductance blocks the AC waveform, i.e., the data, similar to the way that the inductance of a conventional center-tapped transformer conducts DC and blocks AC. DC signal extraction device 501, which uses two serially-connected inductors, may be less costly than a corresponding transformer, which uses two magnetically-coupled inductors.

Figure 6:
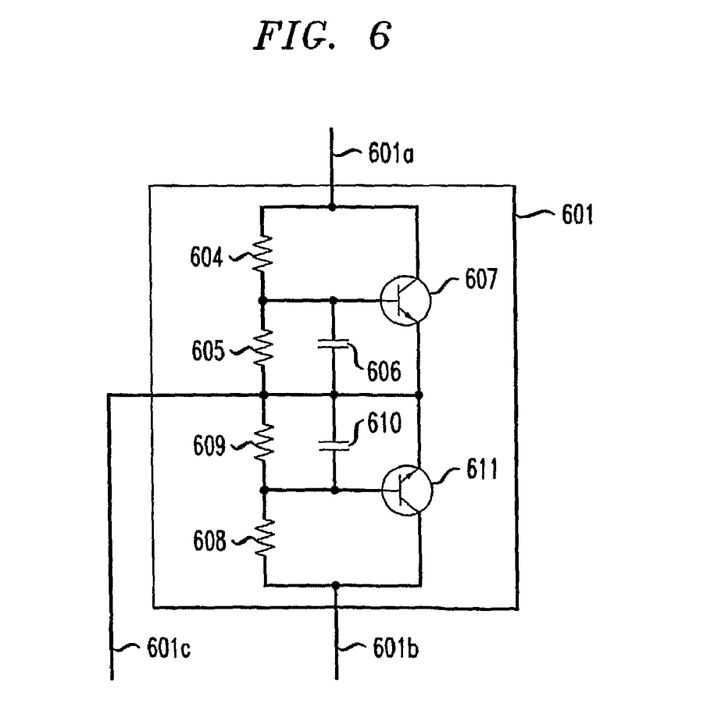
FIG. 6 shows a simplified block diagram of a DC signal extraction device in accordance with another embodiment of the present invention.

FIG. 6 shows a simplified block diagram of DC signal extraction device 601, in accordance with an alternative embodiment of the present invention. DC signal extraction device 601 provides an implementation of DC signal extraction devices, such as devices 215 and 216 of FIGS. 2, 315 and 316 of FIG. 3, and 415, 425, 426, and 416 of FIG. 4. DC signal extraction device 601 comprises two symmetrical sections connected together and to output 601c. The top section of DC signal extraction device 601 is connected to input 601a and comprises resistors 604 and 605, capacitor 606, and transistor 607. The bottom section of DC signal extraction device 601 mirrors the top section and is connected to input 601b and comprises resistor 608 and 609, capacitor 610, and transistor 611.

Input 601a is connected to a first end of resistor 604 and to the collector node of transistor 607. A second end of resistor 604 is connected to (i) a first end of resistor 605, (ii) a first end of capacitor 606, and (iii) the base node of transistor 607. A second end of resistor 605 is connected to (i) output 601c, (ii) a second end of capacitor 606, (iii) the emitter node of transistor 607, (iv) a second end of resistor 609, (v) a second end of capacitor 610, and (vi) the emitter node of transistor 611. A first end of resistor 609 is connected to (i) a second end of resistor 608, (ii) a first end of capacitor 610, and (iii) the base node of transistor 611. Input 601b is connected to a first end of resistor 608 and to the collector node of transistor 611. DC signal extraction device 601 may be implemented as an integrated circuit (IC) or part of an IC, and may thus be less costly than a corresponding transformer.

In DC signal extraction device 601, transistors 607 and 611 are used to provide a low-impedance DC path to output 601c whereby power is extracted from the wire pair, via inputs 601a and 601b, for use by a PD device. Resistor ratios for resistors 604, 605, 608, and 609 are chosen which set the bias points of transistors 607 and 611 to provide acceptable DC losses while providing a sufficiently high cable termination impedance, at the data rate, for the PD application(s) of interest. Capacitors 606 and 610 are tuned to reject control from data signals on the wire pair and to respond at a rate of change commensurate with the power characteristics of the PD device.

In the same or another alternative embodiment, the transformers of RJ45 interface 207 in PSE device 201 of FIG. 2 are replaced by DC signal devices and capacitors so as to mirror the corresponding components of PD device 202, 302, or 402. The connections of DC signal devices and isolation capacitors in a PSE device would be similar to the connections of corresponding components in PD device 202, 302, or 402. However, the "outputs" would function as inputs and will be connected to a PSE module, such as PSE module 204, rather than to a bridge circuit, such as bridge circuit 211. The "inputs" would function as outputs and would continue to connect to the appropriate wire pairs. In this case, the DC signal devices function as DC signal injection devices that inject a DC offset voltage onto two wire pairs. As such, unless specifically limited, the term "DC signal device" should be interpreted to cover DC signal extraction devices that extract DC signals as well as DC signal injection devices that inject DC signals. The PSE device and PD device(s) in a single PoE can use any suitable means for DC signal extraction or injection and electrical isolation and do not all need to use the same means.

Embodiments of the present invention have been described as employing SGMII interfaces between PITY modules and MAC devices. However, any suitable serial interface may be used. Embodiments of the present invention have been described as employing RJ45 interfaces, however any suitable cable interfaces may be used. Embodiments of the present invention have been described as employing bipolar junction transistors, however any suitable transistors or transistor-like devices may be used.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. Apparatus comprising:
a first physical layer interface device adapted to interface between a communication device and a cable further adapted to interface with a second physical layer interface device, wherein:
the first physical layer interface device is adapted to receive incoming data from the cable, transform the incoming data, and transmit the transformed incoming data to the communication device;
the first physical layer interface device is adapted to receive outgoing data from the communication device, transform the outgoing data, and transmit the transformed outgoing data to the cable; and
the cable comprises one or more wire pairs, wherein each wire pair has a first wire and a second wire;
a cable interface adapted to connect between the first physical layer interface device and the cable, the cable interface comprising one or more DC signal devices, each having first and second inputs and an output, wherein:
the first and second wires of at least one wire pair are connected to the first and second inputs, respectively, of a corresponding DC signal device; and
each DC signal device is adapted to extract or inject a DC component of a signal on the corresponding wire pair; and
at least one capacitor located in a signal path between the cable and the communication device, wherein:
the at least one capacitor is located between the first physical layer interface device and the communication device; and
the signal path between the cable and the communication device is transformerless.

2. The invention of claim 1, wherein each signal path between the first physical layer interface device and the communication device includes a capacitor.

3. The invention of claim 1, wherein the apparatus is adapted to operate in an Ethernet network.

4. The invention of claim 3, wherein:
the apparatus is adapted to operate in a Power-over-Ethernet network comprising power sourcing equipment (PSE) and a powered device (PD);
the PD is adapted to be powered by the PSE via the cable; and
the cable is adapted to transmit a data signal between the PSE and the PD.

5. The invention of claim 4, wherein:
the apparatus is located within the PD;
each DC signal device is a DC signal extraction device adapted to extract the DC component of the signal on the corresponding wire pair; and
the second physical layer interface device is located within the PSE.

6. The invention of claim 5, wherein:
the apparatus comprises at least two DC signal extraction devices;
the PD further comprises a bridge circuit having two inputs and two outputs;
the inputs of the bridge circuit are connected to two DC signal extraction devices; and
the outputs of the bridge circuit provide a DC power signal for powering the PD.

7. The invention of claim 1, wherein the at least one capacitor is adapted to support electrical isolation between the cable and the communication device.

8. The invention of claim 1, wherein:
at least one DC signal device is a DC signal extraction device adapted to extract the DC component of the signal on the corresponding wire pair; and
the apparatus is part of a powered device that is adapted to be powered by the extracted DC component.

9. The invention of claim 1, wherein each DC signal device comprises (i) a first section having first and second ends and (ii) a second section, symmetrical to the first section, and having first and second ends, wherein:
- the first end of the first section is connected to the first input;
- the first end of the second section is connected to second input; and
- the second end of the first section is connected to the second end of the second section and to the output.

10. The invention of claim 9, wherein each section comprises an inductor—connected between the first end and the second end.

11. The invention of claim 9, wherein each section comprises:
- first and second resistors each having first and second ends;
- a capacitor having first and second ends; and
- a transistor having a collector node, an emitter node, and a base node, wherein:
  - the first input is connected to the first end of the first resistor and the collector node of the transistor;
  - the second end of the first resistor is connected to the first end of the of the second resistor, the first end of the capacitor, and the base node of the transistor; and
  - the second end of the second resistor is connected to the output, the second end of the capacitor, and the emitter node of the transistor.

12. The invention of claim 1, wherein each capacitor is a ceramic chip capacitor.

13. The invention of claim 1, wherein the communication device is a media access controller (MAC).

14. A powered device (PD), comprising:
- a first physical layer interface device adapted to interface between a communication device and a cable further adapted to interface with a second physical layer interface device, wherein:
  - the first physical layer interface device is adapted to receive incoming data from the cable, transform the incoming data, and transmit the transformed incoming data to the communication device; and
  - the first physical layer interface device is adapted to receive outgoing data from the communication device, transform the outgoing data, and transmit the transformed outgoing data to the cable;
- a cable interface adapted to connect between the first physical layer interface device and the cable, the cable interface comprising one or more DC signal extraction devices, each having first and second inputs and an output, wherein:
  - the cable comprises one or more wire pairs, wherein each wire pair has a first wire and a second wire;
  - the first and second wires of at least one wire pair are connected to the first and second inputs, respectively, of a corresponding DC signal extraction device; and
  - each DC signal extraction device is adapted to extract a DC component of a signal on the corresponding wire pair;
- at least one capacitor located on a signal path between the cable and the communication device, wherein:
  - the at least one capacitor is located between the first physical layer interface device and the communication device; and
  - the signal path between the cable and the communication device is transformerless; and
- additional PD circuitry adapted to be powered by the extracted DC component.

15. A system comprising power sourcing equipment (PSE) connected via a cable to a powered device (PD), wherein:
- the PD comprises:
  - a communication device;
  - a first physical layer interface device adapted to interface between the communication device and the cable, wherein:
    - the first physical layer interface device is adapted to receive incoming data from the cable, transform the incoming data, and transmit the transformed incoming data to the communication device;
    - the first physical layer interface device is adapted to receive outgoing data from the communication device, transform the outgoing data, and transmit the transformed outgoing data to the cable; and
    - the cable comprises one or more wire pairs, wherein each wire pair has a first wire and a second wire;
  - a cable interface adapted to connect between the first physical layer interface device and the cable, the cable interface comprising one or more DC signal extraction devices, each having first and second inputs and an output, wherein the first and second wires of at least one wire pair are connected to the first and second inputs, respectively, of a corresponding DC signal extraction device, and each DC signal extraction device is adapted to extract a DC component of a signal on the corresponding wire pair for powering the PD; and
  - at least one capacitor located on a signal path between the cable and the communication device, wherein:
    - the at least one capacitor is located between the first physical layer interface device and the communication device; and
    - the signal path between the cable and the communication device is transformerless.

16. A transformerless method for providing DC power to and supporting electrical isolation for a powered device (PD) connected to power sourcing equipment (PSE) via a cable, wherein the PD comprises a physical layer device adapted to:
- interface between a communication device and the cable;
- receive incoming data from the cable, transform the incoming data, and transmit the transformed incoming data to the communication device; and
- receive outgoing data from the communication device, transform the outgoing data, and transmit the transformed outgoing data to the cable, the method comprising:
- supporting electrical isolation between the communication device and the cable using a capacitor for each transformerless signal path between the cable and the communication device, wherein the capacitor is located between the first physical layer interface device and the communication device; and
- extracting a DC component of a signal on the corresponding wire pair, without using a transformer, for powering the PD.

17. Apparatus comprising:
- a first physical layer interface device adapted to interface between a communication device and a cable further adapted to interface with a second physical layer interface device, wherein the cable comprises one or more wire pairs, wherein each wire pair has a first wire and a second wire;
- a cable interface adapted to connect between the first physical layer interface device and the cable, the cable interface comprising one or more DC signal devices, each having first and second inputs and an output, wherein:

the first and second wires of at least one wire pair are connected to the first and second inputs, respectively, of a corresponding DC signal device;

each DC signal device is adapted to extract or inject a DC component of a signal on the corresponding wire pair; and each DC signal device comprises (i) a first section having first and second ends and (ii) a second section, symmetrical to the first section, and having first and second ends;

the first end of the first section is connected to the first input;

the first end of the second section is connected to second input;

the second end of the first section is connected to the second end of the second section and to the output;

each section comprises:
  first and second resistors each having first and second ends;
  a capacitor having first and second ends;
  a transistor having a collector node, an emitter node, and a base node;

the first input is connected to the first end of the first resistor and the collector node of the transistor;

the second end of the first resistor is connected to the first end of the of the second resistor, the first end of the capacitor, and the base node of the transistor; and the second end of the second resistor is connected to the output, the second end of the capacitor, and the emitter node of the transistor; and at least one capacitor located in a signal path between the cable and the communication device, wherein the signal path between the cable and the communication device is transformerless.

18. The invention of claim 17, wherein the at least one capacitor is located between a corresponding DC signal device and the first physical layer interface device.

19. The invention of claim 17, wherein each signal path between the cable and the first physical interface device includes a capacitor located between a corresponding DC signal device and the first physical layer interface device.

20. Apparatus comprising:
  a first physical layer interface device adapted to interface between a communication device and a cable further adapted to interface with a second physical layer interface device, wherein:
    the first physical layer interface device is adapted to receive incoming data from the cable, transform the incoming data, and transmit the transformed incoming data to the communication device;
    the first physical layer interface device is adapted to receive outgoing data from the communication device, transform the outgoing data, and transmit the transformed outgoing data to the cable; and
    the cable comprises one or more wire pairs, wherein each wire pair has a first wire and a second wire;
  a cable interface adapted to connect between the first physical layer interface device and the cable, the cable interface comprising one or more DC signal devices, each having first and second inputs and an output, wherein:
    the first and second wires of at least one wire pair are connected to the first and second inputs, respectively, of a corresponding DC signal device; and
    each DC signal device is adapted to extract or inject a DC component of a signal on the corresponding wire pair; and
  at least one capacitor located in a signal path between the cable and the communication device, wherein:
    the signal path between the cable and the communication device is transformerless; and
    each signal path between the first physical layer interface device and the communication device includes a capacitor.

* * * * *